United States Patent
Deckhut et al.

(10) Patent No.: US 7,322,447 B2
(45) Date of Patent: Jan. 29, 2008

(54) DISC BRAKE AND MONITORING DEVICE FOR SUCH A DISC BRAKE

(75) Inventors: Andreas Deckhut, Landau i.d. Pf (DE); Martin Stumpf, Lampertheim (DE)

(73) Assignee: WABCO Radbremsen GmbH, Mannheim (DE)

( * ) Notice: Subject to any disclaimer, the term of this patent is extended or adjusted under 35 U.S.C. 154(b) by 0 days.

(21) Appl. No.: 11/004,298

(22) Filed: Dec. 3, 2004

(65) Prior Publication Data

US 2005/0121265 A1 Jun. 9, 2005

(30) Foreign Application Priority Data

Dec. 4, 2003 (DE) .................. 103 56 801

(51) Int. Cl.
*F16D 66/02* (2006.01)
(52) U.S. Cl. .................. 188/1.11 L; 188/71.1; 188/79.51
(58) Field of Classification Search ........... 188/1.11 A, 188/11, 72.9, 72.7, 71.8, 71.9, 1.11 L, 1.11 W, 188/1.11 E, 71.1, 71.7, 79.51–79.63
See application file for complete search history.

(56) References Cited

U.S. PATENT DOCUMENTS

| | | | | |
|---|---|---|---|---|
| 3,534,835 A | * | 10/1970 | Ernst ........................ | 188/196 R |
| 4,186,822 A | * | 2/1980 | Khuntia et al. ......... | 188/1.11 W |
| 5,501,305 A | * | 3/1996 | Stalmeir et al. ........... | 188/167 |
| 5,632,359 A | * | 5/1997 | Camps et al. ........... | 188/1.11 R |
| 5,848,673 A | * | 12/1998 | Strauss et al. ........... | 188/1.11 L |
| 6,040,665 A | * | 3/2000 | Shirai et al. ................ | 318/14 |
| 6,129,183 A | * | 10/2000 | Ward ........................ | 188/1.11 L |
| 6,272,914 B1 | * | 8/2001 | Ciotti .......................... | 188/11 |
| 6,276,494 B1 | * | 8/2001 | Ward et al. ............. | 188/1.11 W |
| 6,626,269 B2 | * | 9/2003 | Shaw et al. ................. | 188/71.7 |
| 6,820,730 B2 | * | 11/2004 | Angerfors ................... | 188/71.9 |
| 2002/0112927 A1 | * | 8/2002 | Giering et al. ......... | 188/1.11 W |
| 2003/0084714 A1 | * | 5/2003 | Chang et al. ................. | 73/121 |

FOREIGN PATENT DOCUMENTS

| | | | |
|---|---|---|---|
| DE | 43 12 377 | | 10/1993 |
| DE | 4312377 | | 10/1993 |
| DE | 0784162 | | 7/1997 |
| DE | 199 03 620 | | 5/2000 |
| DE | 19903620 C1 | * | 5/2000 |
| DE | 694 23 732 T2 | | 8/2000 |
| DE | 100 36 109 | | 3/2002 |
| DE | 100 36 109 A1 | | 3/2002 |
| DE | 101 32 968 | | 1/2003 |
| DE | 10132968 A1 | * | 1/2003 |
| DE | 697 15 154 T2 | | 5/2003 |
| DE | 10356801 B3 | * | 5/2005 |
| EP | 1538364 A1 | * | 11/2004 |
| WO | 97/29298 | | 8/1997 |
| WO | 2004/111484 | | 12/2004 |
| WO | WO 2004/111484 A1 | * | 12/2004 |

* cited by examiner

*Primary Examiner*—Xuan Lan Nguyen
(74) *Attorney, Agent, or Firm*—Friedrich Kueffner

(57) ABSTRACT

A disc brake has a brake disc and a brake caliper spanning the brake disc. A brake applicator shaft is supported on the brake caliper and arranged transversely to an axis of rotation of the brake disc. The brake applicator shaft has a rotary lever for actuating the brake applicator shaft. An adjusting device provided with a thrust spindle having an end face facing away from the brake disc is provided. The brake applicator shaft transmits upon brake application a brake force through the thrust spindle onto the brake disc. A monitoring device is provided that has a measuring element moveable relative to the brake caliper and resting against the end face of the thrust spindle.

8 Claims, 4 Drawing Sheets

DISC BRAKE AND MONITORING DEVICE FOR SUCH A DISC BRAKE

BACKGROUND OF THE INVENTION

1. Field of the Invention

The invention relates to a disc brake comprising a brake disc; a brake caliper on which is supported a brake applicator shaft that is actuated by means of a rotary lever and that extends transversely to an axis of rotation of the brake disc; a thrust spindle that belongs to an adjusting device and by means of which upon brake application an application force is transmitted from the brake applicator shaft onto the brake disc; and a monitoring device, in particular, for monitoring wear of the brake, a stroke of the brake, and/or readjustment of the brake.

2. Description of the Related Art

Such a disc brake is disclosed, for example, in European patent application 0 784 162 A2. According to this patent application, a wear sensor 50 and a thrust member 9 form a unitary module, wherein relative movements of the thrust spindles 10, 11 relative to a thrust member are detected by the sensor in that the sensor is connected by means of a gear wheel, toothed rod or the like to the thrust spindles. This solution requires a large number of components. Moreover, mechanical machining of bearing and contact surfaces is required. Finally, the described wear monitoring device assembled of the afore described elements needs radial mounting space within the brake.

German patent application 43 12 377 A1 shows in FIG. 3 a sensor 12 that is mounted laterally to an actuating device 6 within the brake caliper and is connected to the outer wall surface of the actuation device by means of a sliding pin 17. This solution also requires mechanical machining of the bearing and contact surfaces and, again, radial mounting space is required.

German patent application 100 36 109 A1 discloses a reference device 7 that is connected to several brake parts for carrying out measurements at several locations. Accordingly, attachments are required. Moreover, external influences can have an effect on the measured results and also on the reference device.

The above described solutions for monitoring are suitable in principle to fulfill the posed requirements. However, in particular with regard to their configuration and with regard to their arrangement within the brake, improvements are desirable which, on the one hand, require less mounting space by providing fewer parts—and thus contribute to a reduction of the size of the entire brake—and, on the other hand, are connected to the brake parts where measurements are to be taken such that a most precise sensing action is ensured. In this connection, tolerances should have no disadvantageous effect on the measured result. When changing the brake pads, it should not be necessary to readjust/calibrate the brake. The sensing or contacting action should be provided directly on the part whose position is to be determined, for example, with regard to wear or stroke of the brake.

SUMMARY OF THE INVENTION

It is an object of the present invention to improve the disc brake of the aforementioned kind such that it is of a simpler configuration, requires less mounting space, and detects the state of the brake precisely.

The precision is important particularly with regard to the aspect that the parameters are to be used more and more for electronic brake components. In other words, no negative influencing variables, for example, vibrations, and brake distortions, tolerances or external environmental effects, should have an effect on the measured data.

In accordance with the present invention, this is achieved in that the monitoring device comprises a measuring element that is movable relative to the brake caliper and rests against an end face of the thrust spindle which end face is facing away from the brake disc.

By positioning the measuring element such that it is supported on the thrust spindle, drive units or the like are not needed so that the entire configuration is simplified. Since the supporting action is realized at an end face of the thrust spindle that is facing away from the brake disc, the monitoring device can be arranged in a space-saving way "behind" the thrust spindle, when viewed from the brake disc. In particular, radial mounting space is not required. Also, because of the arrangement of the monitoring device "behind" the thrust spindle such that a reference point of the brake caliper can be used that is also "behind" the thrust spindle, the measured result is not affected by brake distortion or the like. It is therefore more precise.

According to the invention, the measuring element is supported preferably on the bottom of a blind bore in the thrust spindle. Accordingly, the blind bore can be used as a mounting space for the monitoring device so that the total mounting space is reduced.

The measuring element is positioned according to the invention preferably concentrically to the thrust spindle. In this way, the precision of the monitoring action is maximized because, for example, brake distortions concentric to the thrust spindle have no effect.

According to another especially preferred simple configuration of the invention, it is provided that the measuring element is a pin.

For a further mounting space reduction, it can be provided according to the invention that the measuring element is a telescoping pin.

Preferably, an elastic device is provided for pretensioning the measuring element against the end face of the thrust spindle. In this way, a reliable support of the measuring element on the end face of the thrust spindle is ensured; this also contributes to precision of the measured results.

It is at least desirable, in some cases even required by law, that the degree of wear can be determined easily. Therefore, in accordance with a specially preferred configuration of the invention, a wear indicator is provided that is visible from the exterior.

An especially simple configuration of the invention provides that the measuring element belongs to the wear indicator.

The monitoring device can be connected to a cable for transmitting the monitoring signal, wherein the cable, in accordance with an especially preferred configuration of the invention, extends starting at the monitoring device transversely to the axis of rotation of the brake disc. Since the monitoring device because of the arrangement "behind" the thrust spindle is independent with regard to rotation, a great freedom with regard to the configuration of the other arrangements is achieved in this way.

In addition to the disc brakes described above in detail, the invention also provides a monitoring device for such disc brakes, in particular, for monitoring wear of the brake, the stroke of the brake, and/or readjustment of the brake.

DESCRIPTION OF THE PREFERRED EMBODIMENTS

Figure 1:
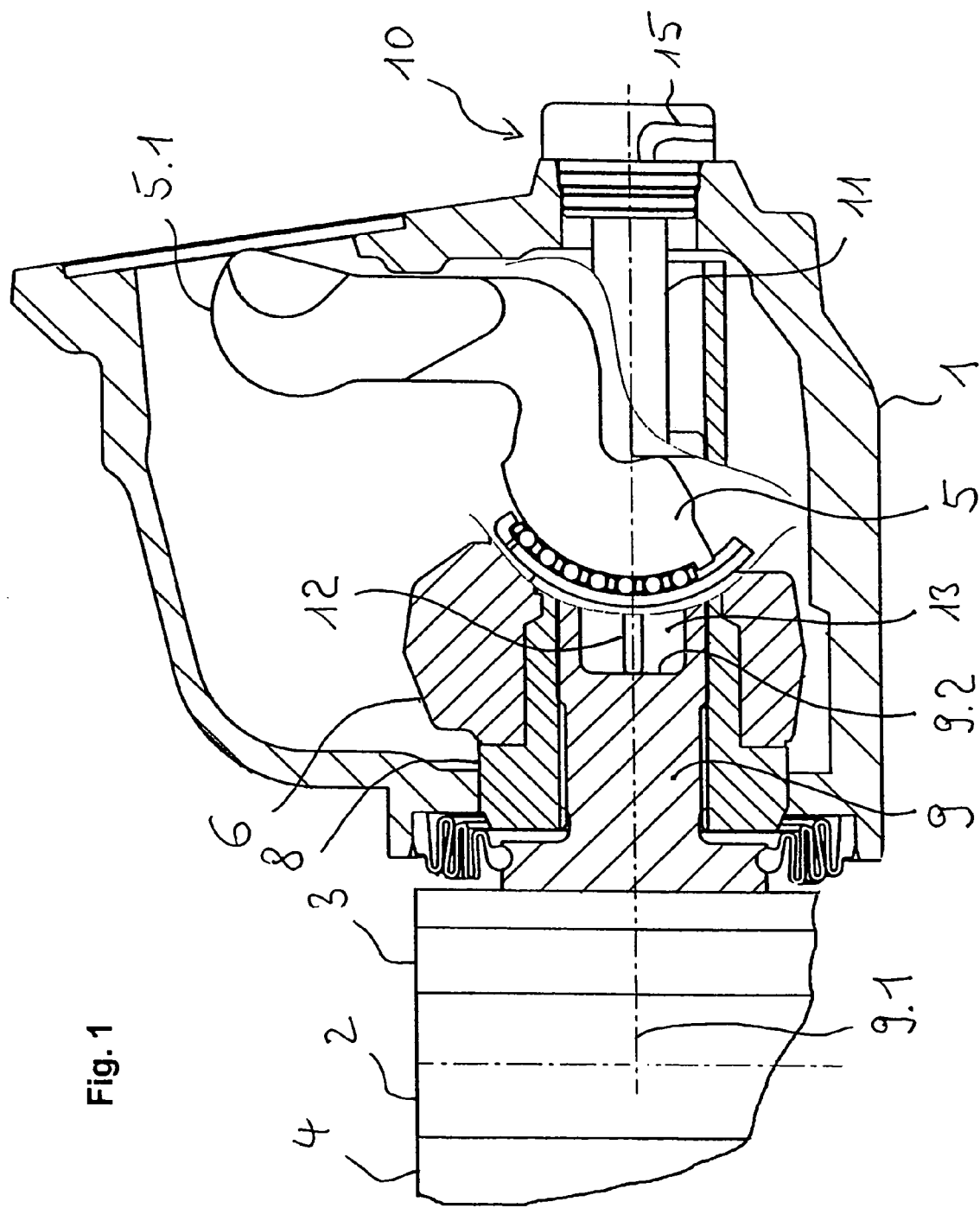
FIG. 1 is a section view of one embodiment of the disc brake according to the invention.

The disc brakes illustrated in the drawings each have a brake caliper 1 spanning, as is conventional, with its two caliper legs a brake disc 2. At both sides of the brake disc 2 brake pads 3, 4 are provided. The brake caliper 1 itself has at least on one side of the brake disc a brake actuating device that, when actuated, forces the brake pads 3, 4 against the brake disc 2. In the brake caliper 1 a rotary lever 5.1 is provided that is pivotably supported about an axis of rotation extending parallel to the main plane of the brake disc 2. An actuating device, not illustrated in the drawing, engages the free end of the rotary lever 5.1 when the brakes are applied. Pivoting of the rotary lever 5.1 causes a rotation of a brake applicator shaft 5 that is coupled to a thrust member 6. The thrust member 6 extends within the brake caliper 1 parallel to the main plane of the brake disc 2. Upon actuation of the rotary lever 5.1, it is forced in the direction toward the brake disc 2. The brake applicator device itself is pre-tensioned by means of a pressure spring 7. The brake applicator shaft 5 has a cam contour. It is expressly noted in this connection that the invention is not limited to the cam contour of the applicator shaft 5 illustrated in the drawing. Instead, the brake applicator shaft 5 can be designed as desired.

Figure 2:
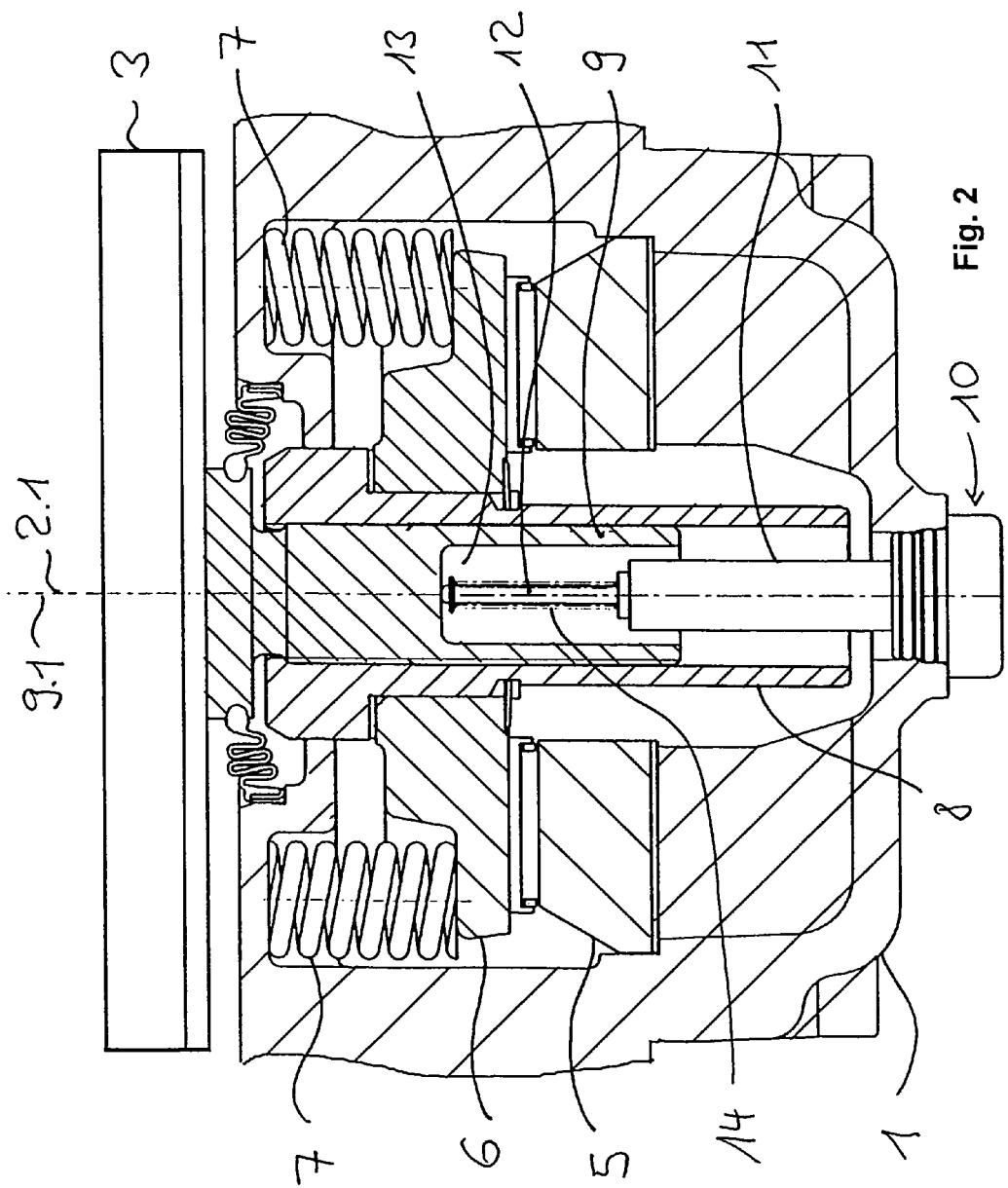
FIG. 2 is a different section view of the disc brake according to FIG. 1.

A central axis 9.1 of the thrust spindle 9 is positioned parallel to a central axis 2.1 of the brake disc 2. In the embodiments illustrated in the drawing having only a single thrust spindle 9, the central axis 9.1 of the thrust spindle 9 coincides with the central axis of the thrust member 6. In the embodiments according to FIGS. 1 through 3, an adjustable nut 8 is provided concentrically to the thrust spindle 9 that forms together with the pressure spindle 9 a thrust spindle unit. This thrust spindle unit is forced by means of a thrust member 6 against the brake pad 3 for applying the brake force when the rotary lever 5.1 is actuated. By means of an adjusting drive, not illustrated in the drawing, a rotation of the thrust spindle unit is carried out for compensating the brake pad/brake disc wear or for adjusting the brake pad clearance, wherein the thrust spindle 9 with increasing wear is unscrewed from the nut. In the configuration according to FIG. 4, the nut 8 is omitted. Instead, the thrust spindle 9 is directly screwed into the thrust member 6. The adjusting drive is known in the art so that it is not explained in detail in this connection.

In the drawing, a wear monitoring device 10 is illustrated which is located at the end of the brake caliper and is positioned coaxially or at least approximately coaxially to the axis of rotation 9.1 of the thrust spindle 9. The spring-tensioned pin 12 that projects from a housing 11 of the wear monitoring device 10 is supported on the end face 9.2, 9.3 of the thrust spindle 9 which end face is facing away from the brake disc 2. In the embodiments according to FIGS. 1 through 3, the end face 9.2 is formed by the bottom of a blind bore 13. In the configuration according to FIG. 4, the end face 9.3 of the thrust spindle 9 coincides with the end of the spindle 9. A spring for pretensioning the pin 12 is referenced by reference numeral 14. The described embodiment provides for a most precise measurement of the relative position of the thrust spindle 9 relative to the brake caliper 1. The more the thrust spindle 9 is unscrewed (for example, to the left in FIG. 1), the farther the pin 12 is moved. The pin 12 must not be mandatorily exactly coaxial to the axis of rotation 9.1 of the thrust member 9. Instead, a slight radial displacement can be tolerated. In such a situation, the end face 9.2, 9.3 across which the pin 12 moves, must be parallel to the main plane of the brake disc 2. In any case, all relative movements that result from wear or stroke movements, are directly determined without any error.

For a further reduction of the axial length, the pin 12 can also be of a telescopic design.

For reasons of mounting space minimization, the thrust spindle unit 8, 9 is open towards the end of the brake caliper 1 so that the pin 12 and the housing 11 of the wear monitoring device 10 can be arranged at least partially therein. In other words, the monitoring device 10 is immersed at least partially in the thrust spindle unit 8, 9 so that it does not enlarge the length, the height, or the width of the brake relative to a configuration without a monitoring device.

The pressure spring 14 ensures a reliable contact to the end face 9.2, 9.3 of the thrust spindle 9 in any operating position so that in any case a reliable detection of the axial position of the thrust spindle 9, and thus also of wear, is provided.

Figure 3:
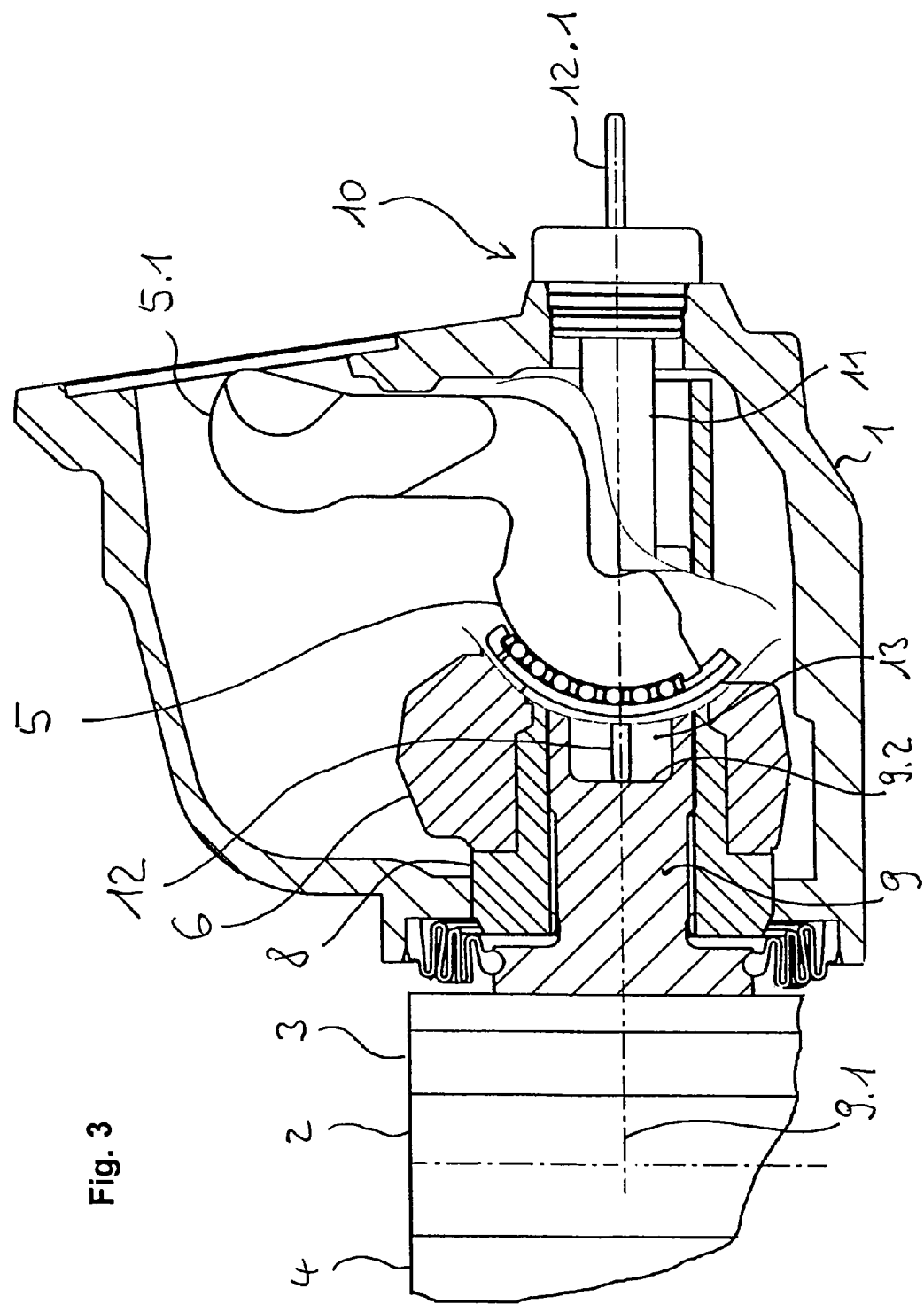
FIG. 3 shows the same view as FIG. 1 illustrating an embodiment with a wear indicator.
Figure 4:
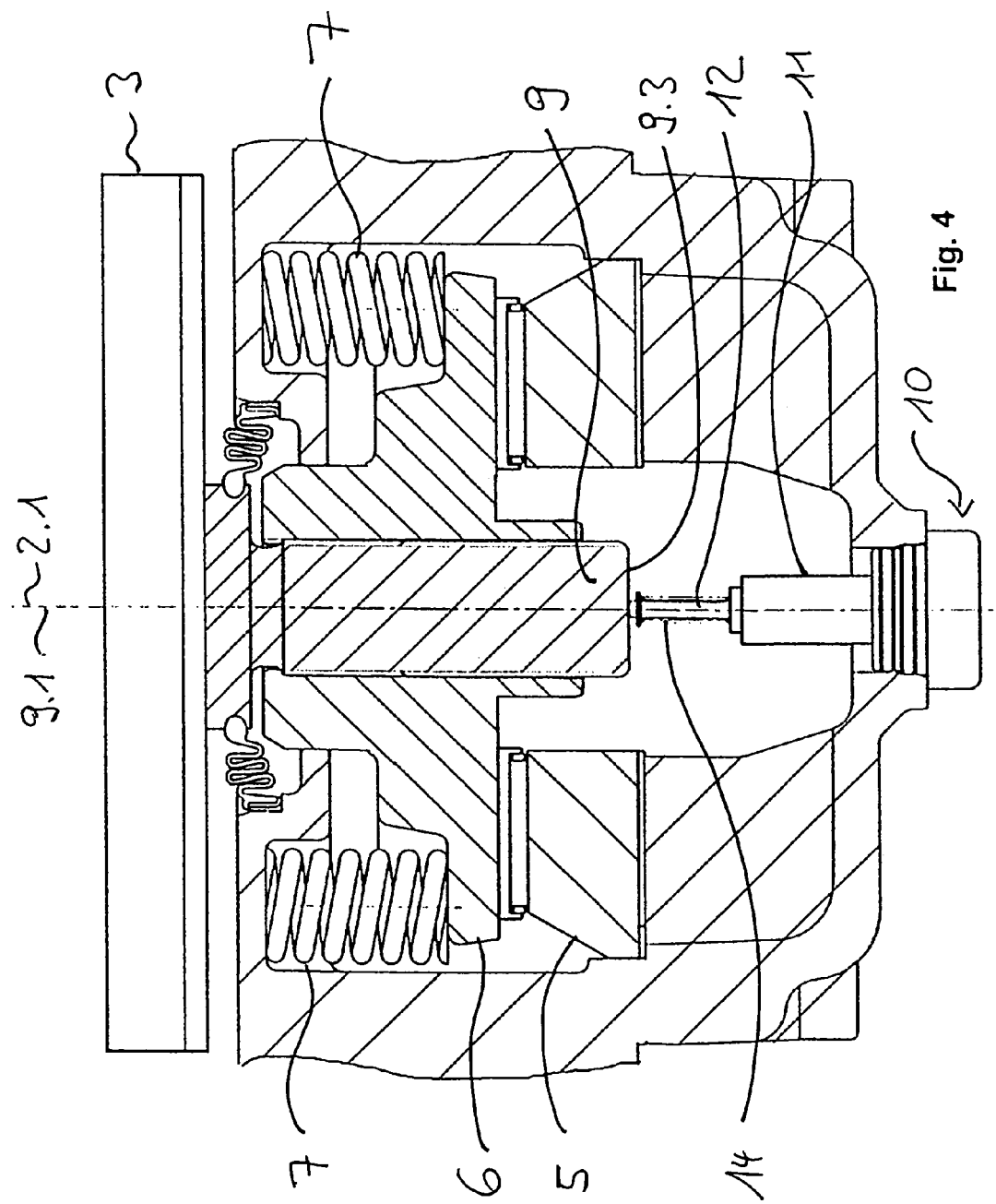
FIG. 4 shows the same view as FIG. 2 illustrating a thrust spindle that is screwed directly into the thrust member.

In the configuration according to FIG. 3, the pin 12 projects with a section 12.1 from the housing 11, in the drawing to the right. In this way, a visual wear indicator is realized (often required by law). With increasing wear the pin 12 and thus its end 12.1 will move to the left in the drawing. The size can be selected such that the pin end 12.1 is still visible for a still tolerable wear while the disappearance of the pin end 12.1 in the housing 11 is an indication that the brake pads must be changed.

For electrical connection of the wear monitoring device 10 a cable passage is provided within the wear monitoring device 10. This cable passage is only schematically indicated in FIG. 1. It is referenced by the reference numeral 15. The cable passage 15 is angled. In other words, it provides a deflection of a cable which extends within the brake caliper 1 parallel to the axis of rotation 9.1 of the thrust spindle 9, but directly after exiting from the brake caliper 1 is bent so that it exits transversely to the axis of rotation 9.1 of the thrust spindle 9 from the housing 11 of the monitoring device 10. Because the wear monitoring device 10 can be rotated without losing contact between the pin 12 and the end face. 9.2, 9.3, any mounting position of the aforementioned cable can be realized in accordance with the local conditions.

Even though the invention has been explained in connection with a brake arrangement having a single spindle, the invention is not limited to this configuration. Instead, the invention is also applicable for brake systems having several spindles.

In summarizing the above, the invention has the following advantages.

The monitoring device uses in a space-saving way the interior of the thrust spindle unit so that no additional mounting space within the brake caliper is required.

No auxiliary means for sensing the parameters is required because sensing is realized directly at the thrust spindle. In this way, tolerances have no effect on the measured results.

A calibration/adjustment after brake pad change is not required. Any position of the rotating thrust spindle is directly detected. This is also true for a possible exchange of the monitoring device because the instant direct contact is detected in any position of the thrust spindle.

The monitoring device can be combined in a simple way (without additional parts) with a visual wear control.

By arranging the pin within the thrust spindle in the rotation-independent zone, the pin is decoupled from the actual rotary movements of the thrust spindle so that rotary movements have no effect on the monitoring device and must not be transmitted. The pin is movable exclusively in the longitudinal direction.

Because of its configuration, the monitoring device is free of brake distortions.

The desired or selected type of the measured parameter to be measured by means of the monitoring device is not limited to detecting the sum of wear of both pads or the brake disc in the case of a floating caliper disc brake. The measured parameter can serve at the same time also for stroke monitoring of the brake applicator device because in this connection opposite relative movements between the brake caliper and the thrust spindle take place. Moreover, a continuous and/or step-wise detection and/or a limit value detection can be realized. This holds true for configurations with floating caliper as well as for configurations with hinged calipers. This is also applicable for fixed caliper disc brakes with brake applicator devices arranged on one or both sides of the brake disc, for example, with individual sensing of the state of the brake.

The inner configuration of the monitoring device with a medium for detecting the position of the pin as a function of the thrust spindle position can be freely selected in accordance with the specific requirements, for example, electrically (potentiometer).

The type of transmission of the measured parameter to an evaluation or indicating device and/or to other brake components, for example, an adjusting device, for example, for its control and/or activation, is possible as desired. The transmission can be realized electrically by providing cables. The monitoring device can also have a sender for carrying out data transmission to a receiver that, in turn, serves for remote transmission of brake states or acts directly on the control and governing components of the brake system.

The features of the invention disclosed in the above description, the claims, and the drawings can be important individually as well as in any combination for realizing the invention in various embodiments.

While specific embodiments of the invention have been shown and described in detail to illustrate the inventive principles, it will be understood that the invention may be embodied otherwise without departing from such principles.

What is claimed is:

1. A disc brake comprising:
   a brake disc;
   a brake caliper spanning the brake disc;
   a brake applicator shaft supported on the brake caliper and arranged transversely to an axis of rotation of the brake disc, wherein the brake applicator shaft has a rotary lever for actuating the brake applicator shaft;
   an adjusting device comprising a thrust spindle having an end face facing away from the brake disc;
   wherein the brake applicator shaft transmits upon brake application a brake force through the thrust spindle onto the brake disc;
   a monitoring device comprising a measuring element moveable axially relative to the brake caliper and resting against the end face of the thrust spindle, wherein the thrust spindle has a blind bore having a bottom, wherein the bottom is the end face against which the measuring element rests.

2. The disc brake according to claim 1, wherein the measuring element is concentric to the thrust spindle.

3. The disc brake according to claim 1, wherein the measuring element is a pin.

4. The disc brake according to claim 1, wherein the measuring element is a telescoping pin.

5. The disc brake according to claim 1, wherein the monitoring device further comprises an elastic device for pretensioning the measuring element against the end face.

6. The disc brake according to claim 1, wherein the monitoring device comprises a wear indicator visible from the exterior of the disc brake.

7. The disc brake according to claim 6, wherein the measuring element is the wear indicator.

8. The disc brake according to claim 1, wherein the monitoring device comprises a cable for transmitting a monitoring signal, wherein the cable extends away from the monitoring device transversely to an axis of rotation of the thrust spindle.

* * * * *